United States Patent
Kojima et al.

(10) Patent No.: US 9,856,913 B2
(45) Date of Patent: Jan. 2, 2018

(54) FLUID DYNAMIC BEARING MANUFACTURING METHOD

(71) Applicant: Nidec Corporation, Kyoto (JP)

(72) Inventors: Takeshi Kojima, Kyoto (JP); Yuya Tamura, Kyoto (JP); Keita Hasegawa, Kyoto (JP); Kazuya Sato, Kyoto (JP); Yuki Konishi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 161 days.

(21) Appl. No.: 15/086,468

(22) Filed: Mar. 31, 2016

(65) Prior Publication Data

US 2016/0290405 A1 Oct. 6, 2016

(30) Foreign Application Priority Data

Apr. 1, 2015 (JP) .................................. 2015-074709

(51) Int. Cl.
*F16C 43/02* (2006.01)
*F16C 33/10* (2006.01)

(52) U.S. Cl.
CPC ........ *F16C 33/105* (2013.01); *F16C 2370/12* (2013.01)

(58) Field of Classification Search
CPC ............................ F16C 33/105; F16C 2370/12
See application file for complete search history.

(56) References Cited

U.S. PATENT DOCUMENTS

| 7,343,682 B2 * | 3/2008 | Sumi | .................... F16C 17/107 141/5 |
|---|---|---|---|
| 2004/0107577 A1 | 6/2004 | Hayashi et al. | |
| 2004/0256178 A1 | 12/2004 | Neumann et al. | |
| 2005/0000092 A1 | 1/2005 | Misu et al. | |
| 2005/0095159 A1 | 5/2005 | Sumi et al. | |
| 2008/0209732 A1 | 9/2008 | Misu et al. | |

FOREIGN PATENT DOCUMENTS

JP          2002-213452 A         7/2002

* cited by examiner

*Primary Examiner* — Ryan J Walters
(74) *Attorney, Agent, or Firm* — Keating & Bennett, LLP

(57) ABSTRACT

A pressure inside a chamber in which a bearing is arranged is reduced. Thus, a pressure inside an oil tank and the pressure inside the chamber are made lower than atmospheric pressure, and are placed in a minimal or no pressure difference condition. Next, a lubricating oil is supplied from the oil tank into the chamber through power of a liquid transfer pump. The lubricating oil is thus injected into the bearing inside the chamber. Thus, the lubricating oil can be supplied from the oil tank into the chamber while maintaining the pressure at substantially the same level lower than that of the atmospheric pressure. Accordingly, gas can be prevented from dissolving into the lubricating oil which has once been deaerated by a pressure reduction inside the oil tank. In addition, because a driving force of the liquid transfer pump is used for supply of the lubricating oil, it is easy to control the amount of the lubricating oil to be supplied.

22 Claims, 9 Drawing Sheets

FLUID DYNAMIC BEARING MANUFACTURING METHOD

BACKGROUND OF THE INVENTION

1. Field of the Invention

The present invention relates to a bearing manufacturing method.

2. Description of the Related Art

A spindle motor arranged to rotate a disk is typically installed in a disk drive apparatus, such as, for example, a hard disk drive. Qualities such as, for example, low vibration, high rotational accuracy, and high durability are demanded of the spindle motor. A fluid dynamic bearing is sometimes used as a bearing of the spindle motor to provide these qualities.

The fluid dynamic bearing includes a stationary bearing member, a rotatable bearing member, and a lubricating oil arranged therebetween. While the fluid dynamic bearing is operating, a dynamic pressure is induced in the lubricating oil by a dynamic pressure groove defined in the stationary bearing member or the rotatable bearing member. As a result, the rotatable bearing member accurately and smoothly rotates with respect to the stationary bearing member. In the case of the fluid dynamic bearing as described above, if gas is introduced into the lubricating oil inside the bearing, the gas may, for example, become a gas bubble to reduce performance of the fluid dynamic bearing. Therefore, in a process of manufacturing the fluid dynamic bearing, it is necessary to deaerate the lubricating oil and prevent gas from being introduced into the lubricating oil after the lubricating oil is deaerated. A known method of manufacturing a fluid dynamic bearing is described in, for example, JP-A 2002-213452.

In a general process of injecting the lubricating oil into the fluid dynamic bearing, a pressure inside an oil tank, from which the lubricating oil is supplied, is made higher than a pressure inside a chamber in which the bearing is arranged, and the lubricating oil is supplied from the oil tank to the chamber using the pressure difference. This method involves increasing the pressure inside the oil tank, from which the lubricating oil is supplied, and this may cause gas to be dissolved into the lubricating oil which has once been deaerated.

In the manufacturing method described in JP-A 2002-213452, a pressure inside a first vacuum chamber in which the bearing is arranged is set at a value equivalent to or slightly lower than a set value of a pressure inside a second vacuum chamber in which a lubricating fluid is stored. Thus, when an on-off valve is opened, the lubricating fluid inside the second vacuum chamber flows toward the first vacuum chamber because of gravity. However, the method described in JP-A 2002-213452 has a problem in that it is difficult to precisely control the amount of the lubricating fluid to be supplied, because gravity is used for supply of the lubricating oil.

SUMMARY OF THE INVENTION

According to a preferred embodiment of the present invention, there is provided a bearing manufacturing method which supplies a lubricating oil stored in an oil tank under a reduced pressure environment to a bearing inside a chamber connected with the oil tank through piping and a liquid transfer pump. The liquid transfer pump includes a housing defining a channel for the lubricating oil, and a rotor arranged to be magnetically levitated and rotate without making contact with the housing to generate a pressure which causes the lubricating oil to travel toward the chamber in the lubricating oil. The bearing manufacturing method includes the steps of: a) arranging the bearing inside the chamber; b) reducing a pressure inside the chamber to make both a pressure inside the oil tank and the pressure inside the chamber lower than an atmospheric pressure, and to place the pressure inside the oil tank and the pressure inside the chamber in a minimal or no pressure difference condition which, if the liquid transfer pump were not provided, would not cause a flow of the lubricating oil in the piping; c) after step b), supplying the lubricating oil from the oil tank into the chamber through power of the liquid transfer pump to inject the lubricating oil into the bearing; and d) after step c), increasing the pressure inside the chamber.

According to the above preferred embodiment of the present invention, the lubricating oil can be supplied from the oil tank into the chamber while maintaining the pressure at substantially the same level lower than that of the atmospheric pressure. Accordingly, gas can be prevented from dissolving into the lubricating oil which has once been deaerated by a pressure reduction inside the oil tank. In addition, a driving force of the liquid transfer pump is used for the supply of the lubricating oil. Accordingly, it is easy to control the amount of the lubricating oil to be supplied.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Structure of Oil Supply Apparatus

Figure 1:
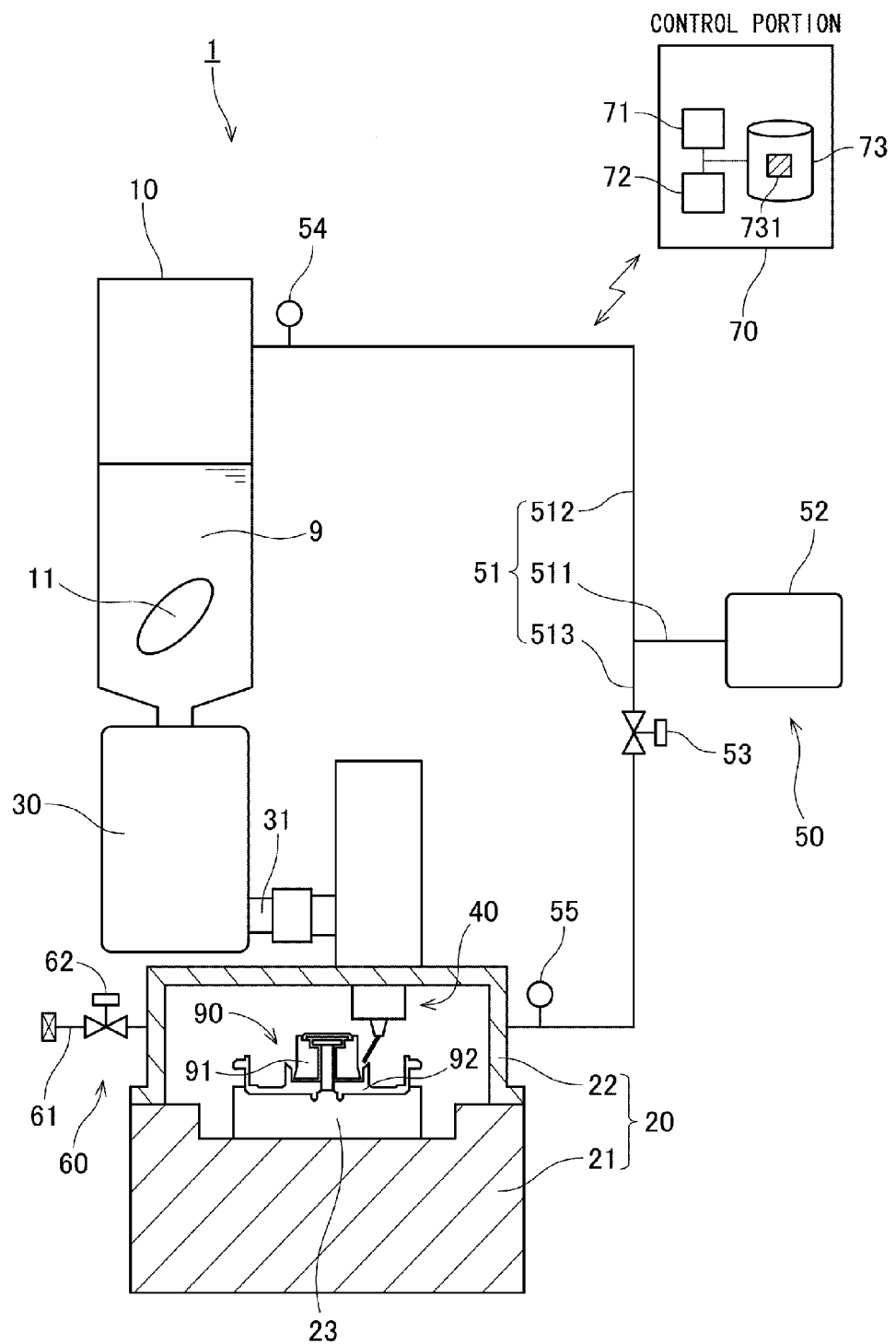
FIG. 1 is a diagram illustrating the structure of an oil supply apparatus according to a preferred embodiment of the present invention.

FIG. 1 is a diagram illustrating the structure of an oil supply apparatus 1 according to a preferred embodiment of the present invention. The oil supply apparatus 1 is an apparatus used to supply a lubricating oil 9 to a gap between a stationary bearing member 91 and a rotatable bearing member 92 of a fluid dynamic bearing 90 (hereinafter referred to simply as the "bearing 90") in a process of manufacturing the bearing 90. After being manufactured, the bearing 90 is used, for example, as a portion of a spindle motor installed in a disk drive apparatus, such as, for example, a hard disk drive. As illustrated in FIG. 1, the oil supply apparatus 1 includes an oil tank 10, a chamber 20, a liquid transfer pump 30, an oil delivery mechanism 40, a pressure reducing portion 50, a pressure recovery portion 60, and a control portion 70.

The oil tank 10 is a pressure-resistant container in which the lubricating oil 9 is stored before supply thereof. A pressure in an interior space of the oil tank 10 is reduced by a pressure reducing pump 52, which will be described below, to a pressure lower than atmospheric pressure. In addition, a rotator 11 is provided in the oil tank 10. The rotator 11 is caused to rotate to stir the lubricating oil 9 stored in the oil tank 10. As described above, the lubricating oil 9 is stored in the oil tank 10 under reduced pressure, and is stirred therein. Thus, the lubricating oil 9 is deaerated before the supply thereof.

The chamber 20 is a pressure-resistant container in which the bearing 90 is arranged. The chamber 20 includes a base portion 21 and a cover portion 22 which is capable of being lifted and lowered. A stand portion 23 to support the bearing 90 is arranged on an upper surface of the base portion 21. Once the cover portion 22 is lifted, the chamber 20 becomes open to allow installation of the bearing 90 in the chamber 20 and removal of the bearing 90 from the chamber 20. On the other hand, once the cover portion 22 is lowered to bring the base portion 21 and the cover portion 22 into close contact with each other, the chamber 20 becomes closed. At the time of the supply of the lubricating oil 9, a pressure in an interior space of the chamber 20 is reduced by the pressure reducing pump 52, which will be described below, to a pressure lower than the atmospheric pressure.

The liquid transfer pump 30 is arranged at a point along piping 31 arranged to join the oil tank 10 and the chamber 20 to each other. An operation of the liquid transfer pump 30 causes the lubricating oil 9 stored in the oil tank 10 to be transferred to the oil delivery mechanism 40 through the piping 31. In the present preferred embodiment, a magnetically levitated centrifugal pump is used as the liquid transfer pump 30.

Figure 2:
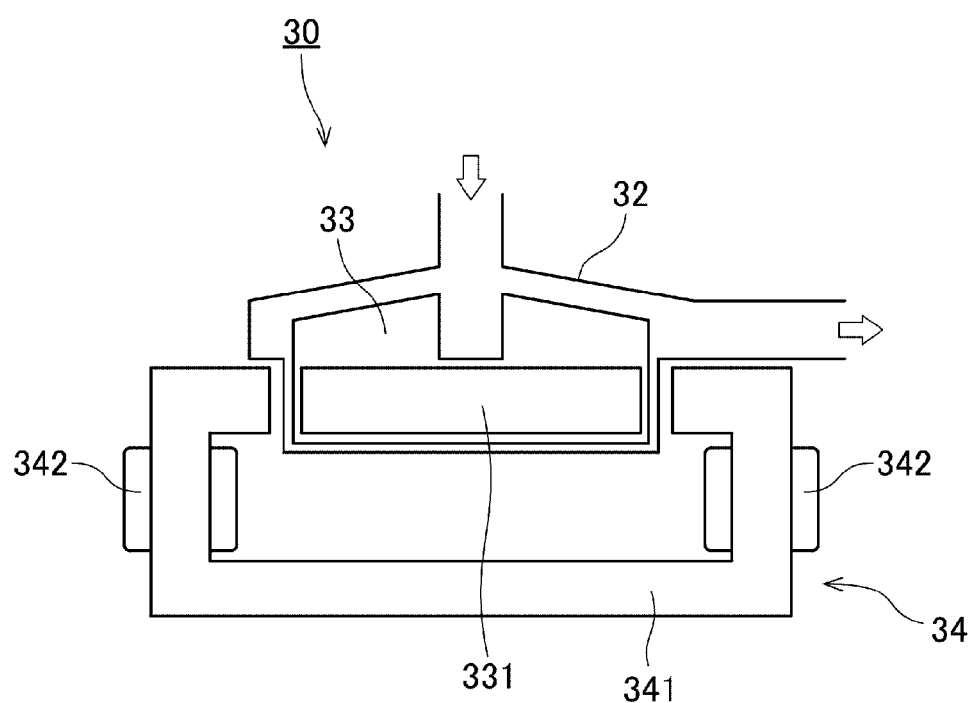
FIG. 2 is a diagram illustrating the structure of a liquid transfer pump according to a preferred embodiment of the present invention.

FIG. 2 is a diagram illustrating the structure of the liquid transfer pump 30. As illustrated in FIG. 2, the liquid transfer pump 30 includes a housing 32, a rotor 33, and a stator 34. The housing 32 defines a channel for the lubricating oil 9. That is, the housing 32 is a portion of the piping 31 arranged to join the oil tank 10 and the chamber 20 to each other. The rotor 33 is arranged inside the housing 32. An outer circumferential surface of the rotor 33 is magnetized by a magnet 331 arranged therein. The stator 34 includes a stator core 341 and a plurality of coils 342.

Once electric drive currents are supplied to the coils 342, a rotating magnetic field is generated in the stator core 341. Then, interaction between magnetic flux of the stator core 341 and magnetic flux of the magnet 331 causes the rotor 33 to rotate while floating inside the housing 32. As a result, a pressure which causes the lubricating oil 9 to travel from the oil tank 10 toward the chamber 20 is generated in the lubricating oil 9 in the housing 32. Because the rotor 33 is magnetically levitated in the liquid transfer pump 30, which is the magnetically levitated centrifugal pump, as described above, the rotor 33 rotates without making contact with the housing 32. Thus, use of the magnetically levitated centrifugal pump as the liquid transfer pump 30 contributes to reducing the likelihood that dust will be generated by a contact between the housing 32 and the rotor 33 while the liquid transfer pump 30 is operating. Accordingly, the lubricating oil 9 can be supplied to the bearing 90 while minimizing contamination of the lubricating oil 9.

Figure 3:
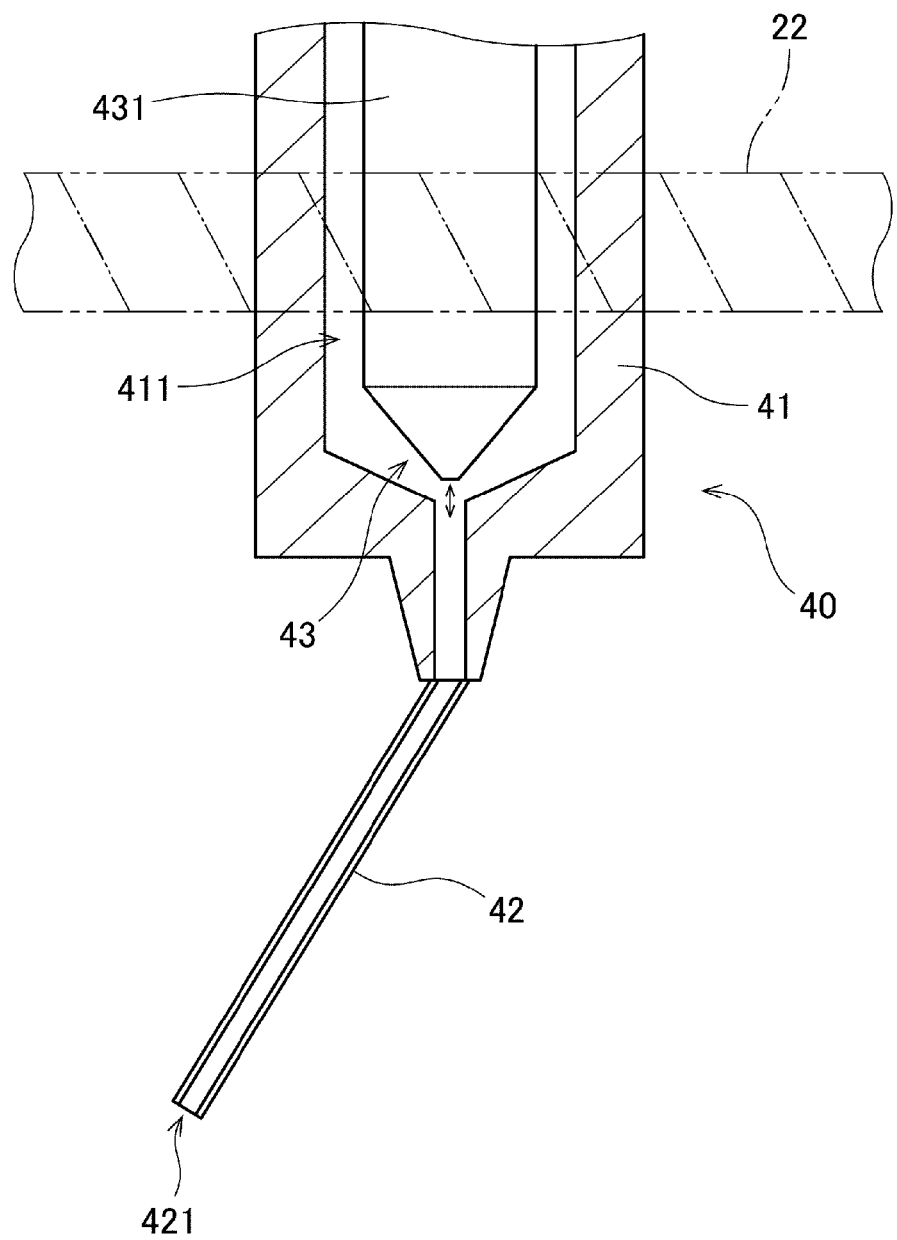
FIG. 3 is a partial cross-sectional view of an oil delivery mechanism according to a preferred embodiment of the present invention.

The oil delivery mechanism 40 is a mechanism to deliver the lubricating oil 9 to the bearing 90 arranged in the chamber 20. FIG. 3 is a partial cross-sectional view of the oil delivery mechanism 40. As illustrated in FIG. 3, the oil delivery mechanism 40 includes a cylinder 41, an injection tube portion 42, and a delivery on-off valve 43. The cylinder 41 is fixed to the cover portion 22 of the chamber 20. A channel 411 for the lubricating oil 9 which joins the liquid transfer pump and the injection tube portion 42 to each other is defined inside the cylinder 41. The injection tube portion 42 is a tube in the shape of a needle, and is joined to a lower end of the cylinder 41. A lower end of the injection tube portion 42 defines an outlet 421 through which the lubricating oil 9 is discharged. The outlet 421 is arranged inside the chamber 20.

The delivery on-off valve 43 includes a valve body 431 arranged inside the cylinder 41. The valve body 431 is arranged to be lifted and lowered in accordance with instructions from the control portion 70. When the lubricating oil 9 is supplied to the bearing 90, the valve body 431 is lifted to open the channel 411 inside the cylinder 41. Thus, the lubricating oil 9 transferred from the liquid transfer pump 30 passes through the channel 411 inside the cylinder 41 and the injection tube portion 42, and is discharged through the outlet 421. On the other hand, when the supply of the lubricating oil 9 is stopped, the valve body 431 is lowered to close the channel 411 inside the cylinder 41.

The pressure reducing portion 50 is a mechanism to reduce the pressure in each of the interior space of the oil tank 10 and the interior space of the chamber 20. As illustrated in FIG. 1, the pressure reducing portion 50 includes exhaust piping 51, the pressure reducing pump 52, a first on-off valve 53, a first pressure sensor 54, and a second pressure sensor 55. The exhaust piping 51 includes a main pipe 511, a tank-side branch pipe 512, and a chamber-side branch pipe 513. An upstream end portion of the tank-side branch pipe 512 with respect to an exhaust direction is joined to the oil tank 10. An upstream end portion of the chamber-side branch pipe 513 with respect to an exhaust direction is joined to the chamber 20. On the other hand, a downstream end portion of each of the tank-side branch pipe 512 and the chamber-side branch pipe 513 with respect to the exhaust direction is joined to an upstream end portion of the main pipe 511 with respect to the exhaust direction. In addition, a downward end portion of the main pipe 511 with respect to the exhaust direction is joined to the pressure reducing pump 52.

The first on-off valve 53 is arranged at a point along the chamber-side branch pipe 513. If the pressure reducing pump 52 is caused to operate when the first on-off valve 53 is in a closed state, suction of the pressure reducing pump 52 causes gas inside the oil tank 10 to be discharged to an outside. As a result, the pressure in the interior space of the oil tank 10 is reduced to a pressure lower than the atmospheric pressure. On the other hand, if the pressure reducing pump 52 is caused to operate when the first on-off valve 53 is in an open state, the suction of the pressure reducing pump 52 causes the gas inside the oil tank 10 and gas inside the chamber 20 to be discharged to the outside. As a result, the pressure in each of the interior space of the oil tank 10 and the interior space of the chamber 20 is reduced to a pressure lower than the atmospheric pressure.

As described above, in the oil supply apparatus 1, both the gas inside the oil tank 10 and the gas inside the chamber 20 are sucked by the common pressure reducing pump 52. Accordingly, when a process of supplying the lubricating oil 9, which will be described below, is performed, it is easy to maintain the pressure inside the oil tank 10 and the pressure inside the chamber 20 in a minimal or no pressure difference condition. Note that the pressure in the interior space of the oil tank 10 is reduced at all times while the pressure reducing pump 52 is operating. On the other hand, the pressure in the interior space of the chamber 20 is reduced at an appropriate time, by opening the first on-off valve 53 as necessary.

The first pressure sensor 54 is arranged at a point along the tank-side branch pipe 512. The first pressure sensor 54 is arranged to obtain a detection value indicating the pressure (i.e., a gas pressure) inside the oil tank 10. The second pressure sensor 55 is arranged at a point along the chamber-side branch pipe 513 and on a side of the first on-off valve 53 closer to the chamber 20. The second pressure sensor 55 is arranged to obtain a detection value indicating the pressure (i.e., a gas pressure) inside the chamber 20. Moreover, each of the first pressure sensor 54 and the second pressure sensor 55 is arranged to transmit a detection signal indicating the detection value to the control portion 70.

The pressure recovery portion 60 is a mechanism to increase the pressure inside the chamber 20 which has once been reduced. As illustrated in FIG. 1, the pressure recovery portion 60 includes a purge pipe 61 joined to the chamber 20, and a second on-off valve 62 arranged on the purge pipe 61. If the second on-off valve 62 is opened when the pressure inside the chamber 20 is lower than the atmospheric pressure, air flows into the chamber 20 through the purge pipe 61 from outside of the chamber 20. Thus, the pressure inside the chamber 20 is increased to the atmospheric pressure.

The control portion 70 is arranged to exercise operation control over various portions of the oil supply apparatus 1. As illustrated schematically in FIG. 1, the control portion 70 is defined by a computer including a processing portion 71, such as a CPU, a memory 72, such as a RAM, and a storage portion 73, such as a hard disk drive. A computer program 731 to control an operation of supplying the lubricating oil 9 to the bearing 90 is installed in the storage portion 73.

Figure 4:
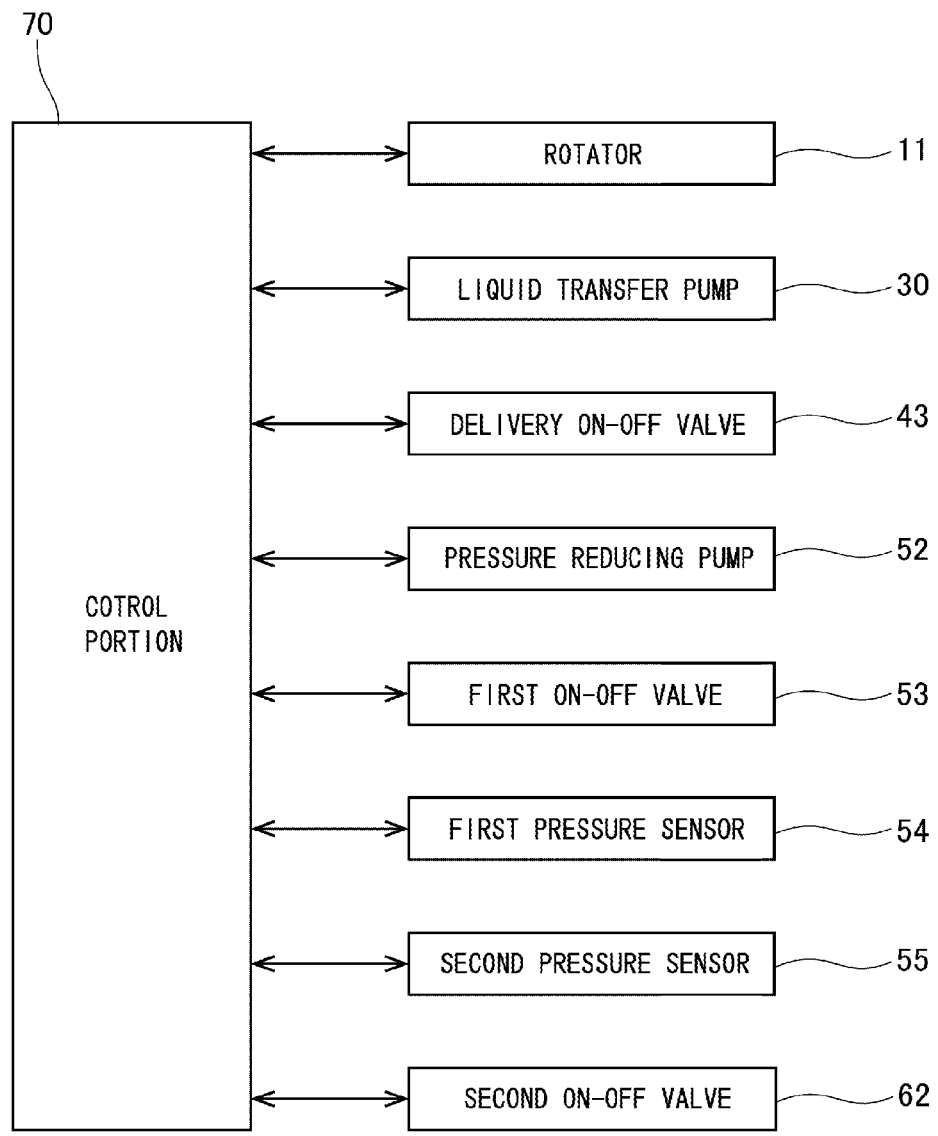
FIG. 4 is a block diagram illustrating how a control portion is connected with various portions of the oil supply apparatus according to a preferred embodiment of the present invention.

FIG. 4 is a block diagram illustrating how the control portion 70 is connected with various portions of the oil supply apparatus 1. As illustrated in FIG. 4, the control portion 70 is electrically connected with the rotator 11, the liquid transfer pump 30, the delivery on-off valve 43, the pressure reducing pump 52, the first on-off valve 53, the first pressure sensor 54, the second pressure sensor 55, and the second on-off valve 62. The control portion 70 temporarily loads the computer program 731 in the storage portion 73 into the memory 72, and the processing portion 71 performs processing based on the computer program 731 to exercise the operation control over the above various portions of the oil supply apparatus 1. The operation of supplying the lubricating oil 9, which will be described below, is thus performed.

2. Operation of Oil Supply Apparatus

Figure 5:
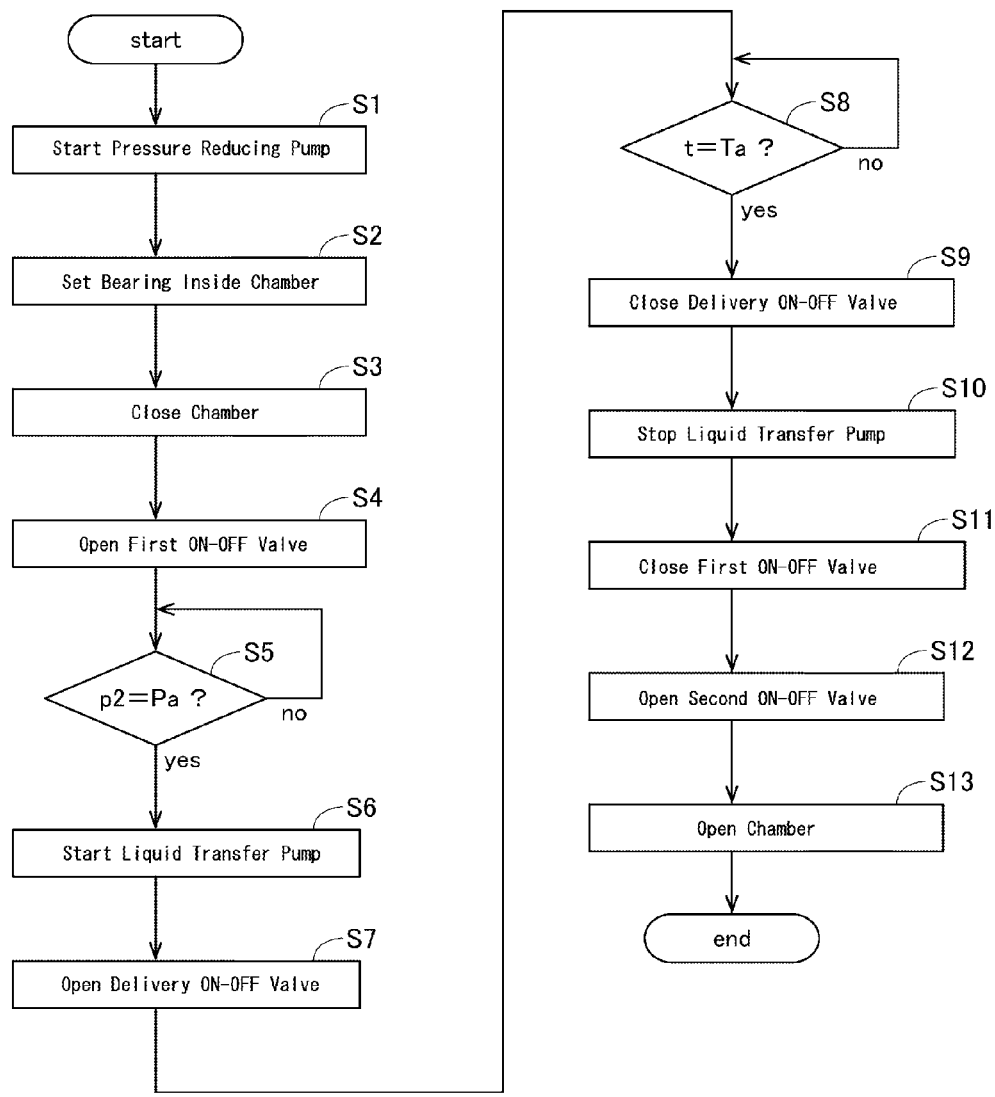
FIG. 5 is a flowchart illustrating a procedure of an operation of the oil supply apparatus according to a preferred embodiment of the present invention.
Figure 6:
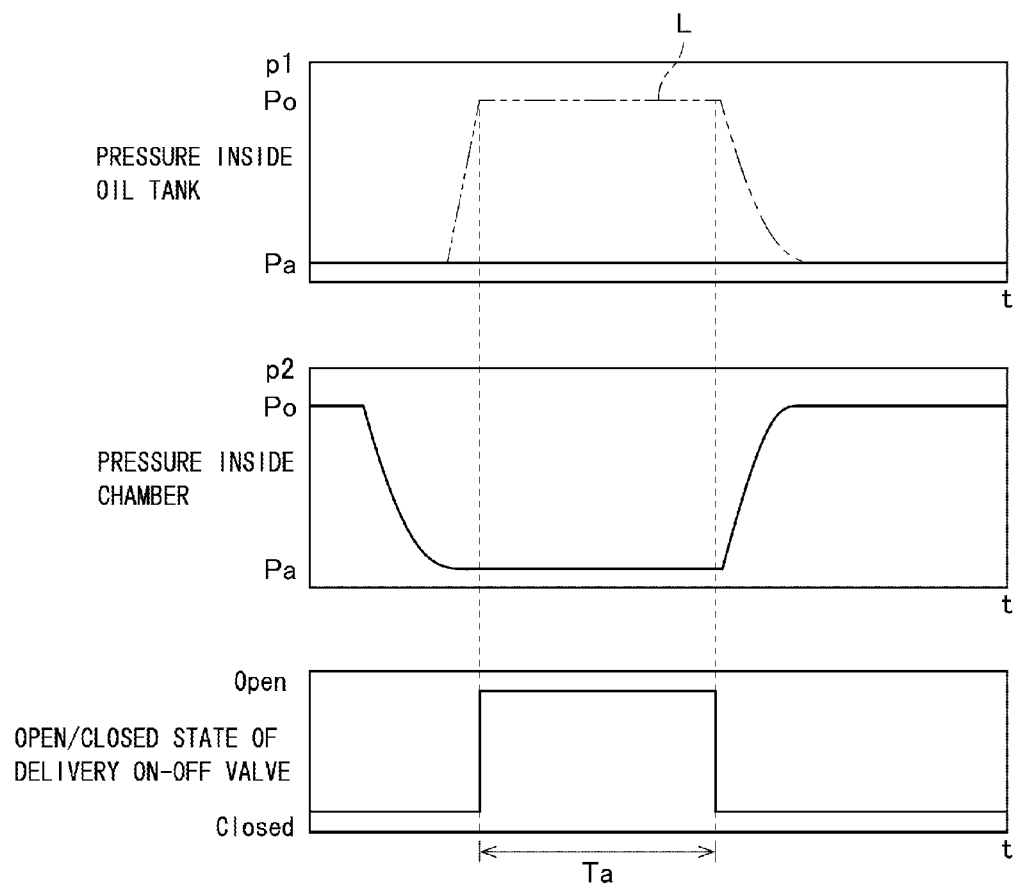
FIG. 6 shows graphs showing changes over time of a pressure inside an oil tank, a pressure inside a chamber, and an open/closed state of a delivery on-off valve, respectively, according to a preferred embodiment of the present invention.

Next, the operation of supplying the lubricating oil 9, which is performed in the oil supply apparatus 1, will now be described below. FIG. 5 is a flowchart illustrating a procedure of the operation of the oil supply apparatus 1. FIG. 6 shows graphs showing changes over time of the pressure inside the oil tank 10, the pressure inside the chamber 20, and an open/closed state of the delivery on-off valve 43, respectively. Note that, in an initial state, each of the delivery on-off valve 43, the first on-off valve 53, and the second on-off valve 62 is closed.

When the process of supplying the lubricating oil 9 is started, the pressure reducing pump 52 is first started with the first on-off valve 53 in the closed state (step S1). Referring to FIG. 6, once the pressure reducing pump 52 is started, the pressure p1 inside the oil tank 10 is reduced to a pressure Pa lower than the atmospheric pressure Po. That is, the interior space of the oil tank 10 is placed under a reduced pressure environment. The lubricating oil 9 stored in the oil tank 10 is deaerated by rotation of the rotator 11 and the pressure reduction by the pressure reducing pump 52. Moreover, the likelihood that gas will be dissolved into the lubricating oil 9 stored in the oil tank 10 is reduced.

Notice that the pressure reducing pump 52 continues to operate while processes of subsequent steps S2 to S13 are performed.

Next, the bearing 90 is arranged inside the chamber 20 (step S2). At step S2, the cover portion 22 of the chamber 20 is first lifted to open the chamber 20. Then, the bearing 90 is set on the stand portion 23. Thereafter, the cover portion 22 is lowered to close the chamber 20 again (step S3). Once the chamber 20 is closed, the interior space of the chamber 20 becomes an enclosed space.

Next, the first on-off valve 53 is opened (step S4). As a result, the pressure inside the chamber 20 is reduced by the suction of the pressure reducing pump 52. Referring to FIG. 6, the pressure p2 inside the chamber 20 gradually decreases from the atmospheric pressure Po toward the pressure Pa lower than the atmospheric pressure Po. Based on the detection value indicated by the detection signal transmitted from the second pressure sensor 55, the control portion 70 determines whether the pressure p2 inside the chamber 20 has been reduced to the pressure Pa, which is substantially the same as the pressure p1 inside the oil tank 10 (step S5). The pressure Pa is preferably 20 Pa or less. The pressure Pa is, for example, 10 Pa.

After a while, the pressure p2 inside the chamber 20 is reduced to the pressure Pa. As a result, the pressure inside the oil tank 10 and the pressure inside the chamber 20 are in the minimal or no pressure difference condition. Now, gas will not be easily dissolved into the deaerated lubricating oil 9 which is supplied into the chamber 20. Note that the term "minimal or no pressure difference" as used herein refers to a pressure relationship which, if the liquid transfer pump were not provided, would not cause a flow of the lubricating oil in the piping even when the delivery on-off valve is open.

Once the pressure p2 inside the chamber 20 is reduced to the pressure Pa, the control portion 70 starts the liquid transfer pump 30 (step S6). As a result, a pressure which causes the lubricating oil 9 to travel from the oil tank 10 toward the chamber 20 is generated in the lubricating oil 9 in the piping 31. Thereafter, the control portion 70 opens the delivery on-off valve 43 (step S7). As a result, the lubricating oil 9 is discharged through the outlet 421 at a tip of the injection tube portion 42 of the oil delivery mechanism 40.

Figure 7:
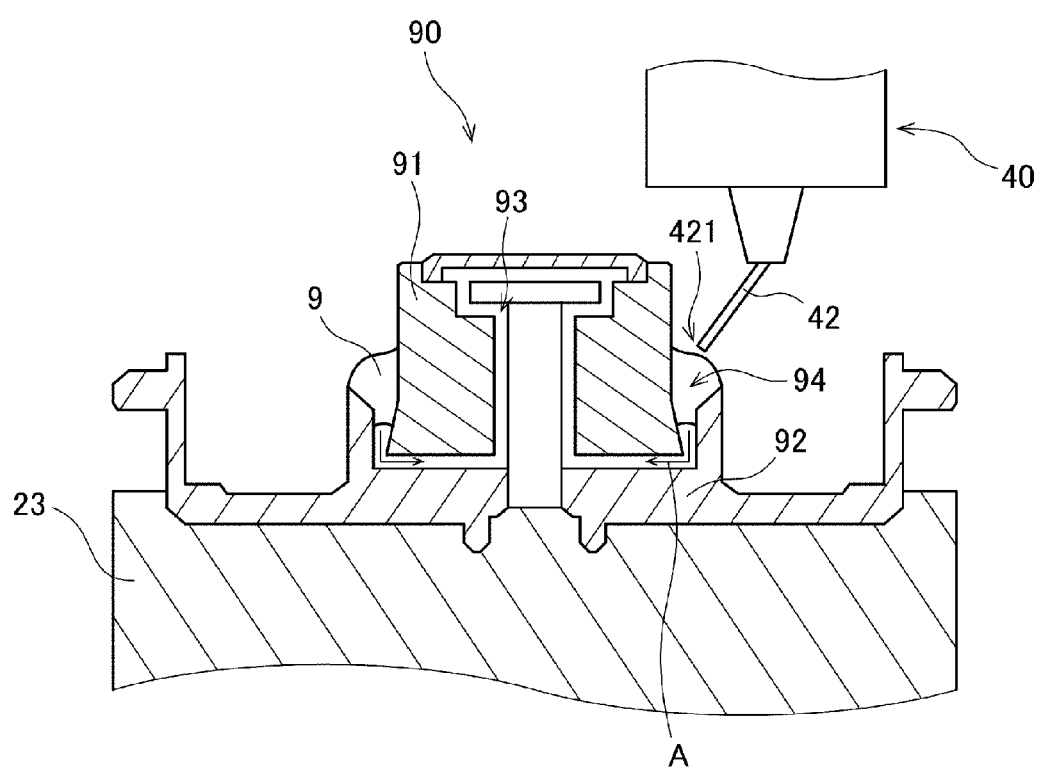
FIG. 7 is a diagram illustrating a section of a bearing arranged in the chamber and a portion of the oil delivery mechanism according to a preferred embodiment of the present invention.

FIG. 7 is a diagram illustrating a section of the bearing 90 arranged in the chamber 20 and a portion of the oil delivery mechanism 40. As illustrated in FIG. 7, the bearing 90 includes the stationary bearing member 91 and the rotatable bearing member 92. A bearing gap 93, into which the lubricating oil 9 is to be injected, is defined between the stationary bearing member 91 and the rotatable bearing member 92. In addition, the bearing 90 includes, between the stationary bearing member 91 and the rotatable bearing member 92, an annular and tapered opening portion 94 which is joined to the bearing gap 93. The width of a gap between the stationary bearing member 91 and the rotatable bearing member 92 at the opening portion 94 is arranged to gradually increase toward an outside of the bearing gap 93.

In a situation in which the chamber 20 is closed, the outlet 421 of the injection tube portion 42 is placed over the opening portion 94 of the bearing 90 arranged in the chamber 20. Thus, at step S7, the lubricating oil 9 is discharged from the outlet 421 toward the opening portion 94 of the bearing 90. Then, the discharged lubricating oil 9 is held in the opening portion 94 of the bearing 90 with the lubricating oil 9 extending over an entire circumferential extent of the opening portion 94.

A hollow tube part made of stainless steel, for example, is used as the injection tube portion 42. An inside diameter (i.e., a diameter of an inner circumferential surface) of the hollow tube part is preferably 0.4 mm or less. Further, the inside diameter of the hollow tube part is more preferably 0.2 mm or less. Meanwhile, an outside diameter (i.e., a diameter of an outer circumferential surface) of the hollow tube part is, for example, 0.7 mm or less. Use of the hollow tube part having such a size contributes to efficient injection of the lubricating oil 9 into the opening portion 94 of the bearing 90.

In the oil supply apparatus 1, power of the liquid transfer pump 30 is used to supply the lubricating oil 9. Accordingly, if the delivery on-off valve 43 is kept open for a predetermined time, a predetermined amount of the lubricating oil 9 can be precisely discharged. The control portion 70 determines whether a time t which has elapsed since the opening of the delivery on-off valve 43 has reached a predetermined time Ta (step S8). If it is determined that the elapsed time t has reached the time Ta, the delivery on-off valve 43 is closed (step S9). Thus, the discharge of the lubricating oil 9 out of the oil delivery mechanism 40 is stopped.

As described above, in the oil supply apparatus 1, the predetermined amount of the lubricating oil 9 is discharged through the outlet 421 by keeping the delivery on-off valve 43 open for the predetermined time.

Thereafter, the control portion 70 stops the liquid transfer pump 30 (step S10), and closes the first on-off valve 53 (step S11). As a result, the reduction of the pressure inside the chamber 20 is stopped. In addition, the control portion 70 opens the second on-off valve 62 of the pressure recovery portion 60 (step S12). Thus, air flows from outside of the chamber 20 into the chamber 20 through the purge pipe 61. As a result, as illustrated in FIG. 6, the pressure p2 inside the chamber 20 increases back to the atmospheric pressure Po. That is, the pressure inside the chamber 20 is increased. Thus, as indicated by arrows A in FIG. 7, the lubricating oil 9 held in the opening portion 94 penetrates into the bearing gap 93 from the opening portion 94.

Once penetration of the lubricating oil 9 into the bearing gap 93 is complete, the cover portion 22 of the chamber 20 is lifted. Thus, the chamber 20 is opened (step S13). Then, the bearing 90 is taken out of the chamber 20 to complete the process of supplying the lubricating oil 9 into the bearing 90.

Note that, in the case where the lubricating oil 9 is to be injected into a next bearing 90, control returns to step S2 after completion of step S13, and the next bearing 90 is arranged inside the chamber 20. Then, the processes of steps S3 to S13 are repeated. The pressure reducing pump 52 continues to operate while the processes of steps S3 to S13 are repeated. Accordingly, the pressure inside the oil tank 10 is maintained at a reduced level at all times.

As described above, in the oil supply apparatus 1, the lubricating oil 9 is supplied from the oil tank 10 into the chamber 20 while maintaining the pressure at substantially the same level lower than that of the atmospheric pressure. Accordingly, the lubricating oil 9 can be injected into the bearing 90 arranged inside the chamber 20 while preventing gas from dissolving into the lubricating oil 9 which has once been deaerated by the pressure reduction inside the oil tank 10.

In a typical related-art oil supply apparatus, a pressure inside an oil tank is increased as represented by a chain double-dashed line L in FIG. 6, and a difference in pressure is used for supply of a lubricating oil. However, in the oil supply apparatus 1, not a difference in pressure between the oil tank 10 and the chamber 20 but a driving force of the liquid transfer pump 30 is used for the supply of the lubricating oil 9. Accordingly, it is easy to control the amount of the lubricating oil 9 to be supplied. Moreover, required power of the liquid transfer pump 30 is lower than in the case where the lubricating oil 9 is supplied from the oil tank 10 under a relatively low pressure to the chamber 20 under a relatively high pressure using the liquid transfer pump 30.

Further, in the oil supply apparatus 1, gravity is not used for the supply of the lubricating oil 9, and therefore, it is not necessary to arrange the oil tank 10 at a position higher than that of the chamber 20. Relative positions of the oil tank 10 and the chamber 20 may be modified in any desirable manner. For example, the oil tank 10 and the chamber 20 may be arranged at the same level to reduce the height of the oil supply apparatus 1.

Furthermore, in the oil supply apparatus 1, the liquid transfer pump 30 continues to operate at all times while the delivery on-off valve 43 is open. Therefore, it is easy to control the amount of the lubricating oil 9 to be discharged, by opening and closing of the delivery on-off valve 43. In addition, a backflow of the lubricating oil 9 and introduction of air into the lubricating oil 9 through the outlet 421 while the delivery on-off valve 43 is open can be prevented.

Furthermore, referring to FIG. 3, in the oil supply apparatus 1, a position at which the channel 411 is opened and closed by the delivery on-off valve 43 is inside the chamber 20. Accordingly, the length of a channel from the position at which the channel 411 is opened and closed to the outlet 421 is shorter than in the case where the position at which the channel 411 is opened and closed is outside of the chamber 20. This contributes to reducing the amount of a portion of the lubricating oil 9 which is held in the channel from the position at which the channel 411 is closed to the outlet 421 when the delivery on-off valve 43 is closed. This contributes to further reducing the amount of air which will be dissolved into the lubricating oil 9 before the lubricating oil 9 is discharged.

3. Modifications

While a preferred embodiment of the present invention has been described above, it is to be understood that the present invention is not limited to the above-described preferred embodiment.

Figure 8:
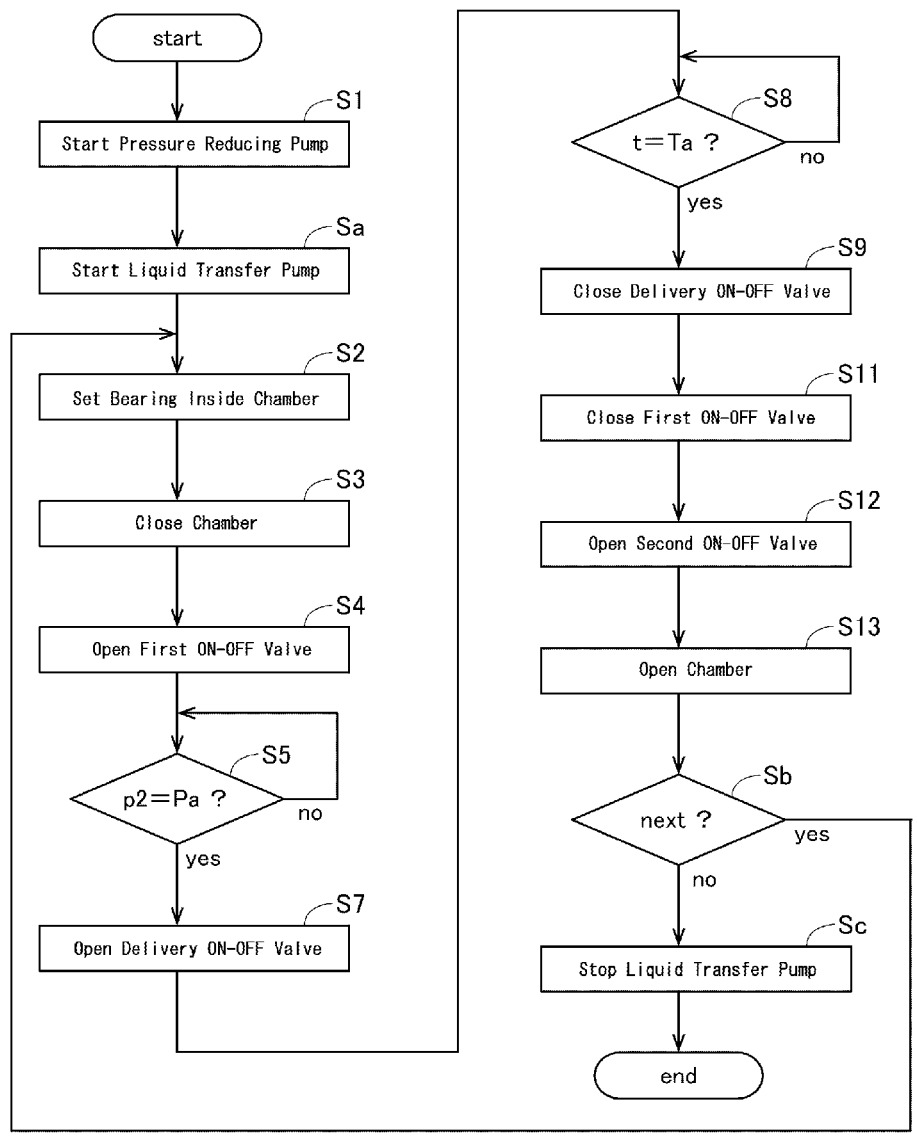
FIG. 8 is a flowchart illustrating an oil supply operation according to a modification of the above preferred embodiment of the present invention.

FIG. 8 is a flowchart illustrating an oil supply operation according to a modification of the above-described preferred embodiment. In the above-described preferred embodiment, the liquid transfer pump 30 is stopped each time the injection of the lubricating oil 9 into one bearing 90 is completed. In contrast, in the modification illustrated in FIG. 8, the lubricating oil 9 is injected into a plurality of bearings 90 while the liquid transfer pump 30 is kept operating at all times.

Specifically, in the modification illustrated in FIG. 8, the liquid transfer pump 30 is started to operate before the first bearing 90 is set inside the chamber 20 (step Sa). Then, after a pressure reduction inside the chamber 20 is completed after the bearing 90 is set inside the chamber 20, the delivery on-off valve 43 is opened (step S7). Thus, a discharge of the lubricating oil 9 is started. Thereafter, after a predetermined amount of the lubricating oil 9 has been discharged, the delivery on-off valve 43 is closed (step S9). Thus, the discharge of the lubricating oil 9 is stopped. Further, the pressure inside the chamber 20 is increased to cause the lubricating oil 9 to penetrate into the bearing gap 93, and then, the bearing 90 is taken out of the chamber 20.

Thereafter, it is determined whether the lubricating oil 9 should be injected into a next bearing 90 (step Sb). If the lubricating oil 9 should be injected into the next bearing 90, control returns to step S2, and the next bearing 90 is set inside the chamber 20. Meanwhile, if it is determined at step Sb that there is not a next bearing 90 into which the lubricating oil 9 should be injected, the liquid transfer pump 30 is stopped (step Sc).

As described above, in the modification illustrated in FIG. 8, the processes of steps S2 to S13 are repeated while the liquid transfer pump 30 is kept operating. Accordingly, the lubricating oil 9 can be quickly supplied to the plurality of bearings 90 without stopping and restarting the liquid transfer pump 30 for each bearing 90. Moreover, the liquid transfer pump 30 is kept operating at all times while the delivery on-off valve 43 is open. Therefore, it is easy to control the amount of the lubricating oil 9 to be discharged, by opening and closing of the delivery on-off valve 43. In addition, a backflow of the lubricating oil 9 and introduction of air into the lubricating oil 9 through the outlet 421 while the delivery on-off valve 43 is open can be prevented.

Figure 9:
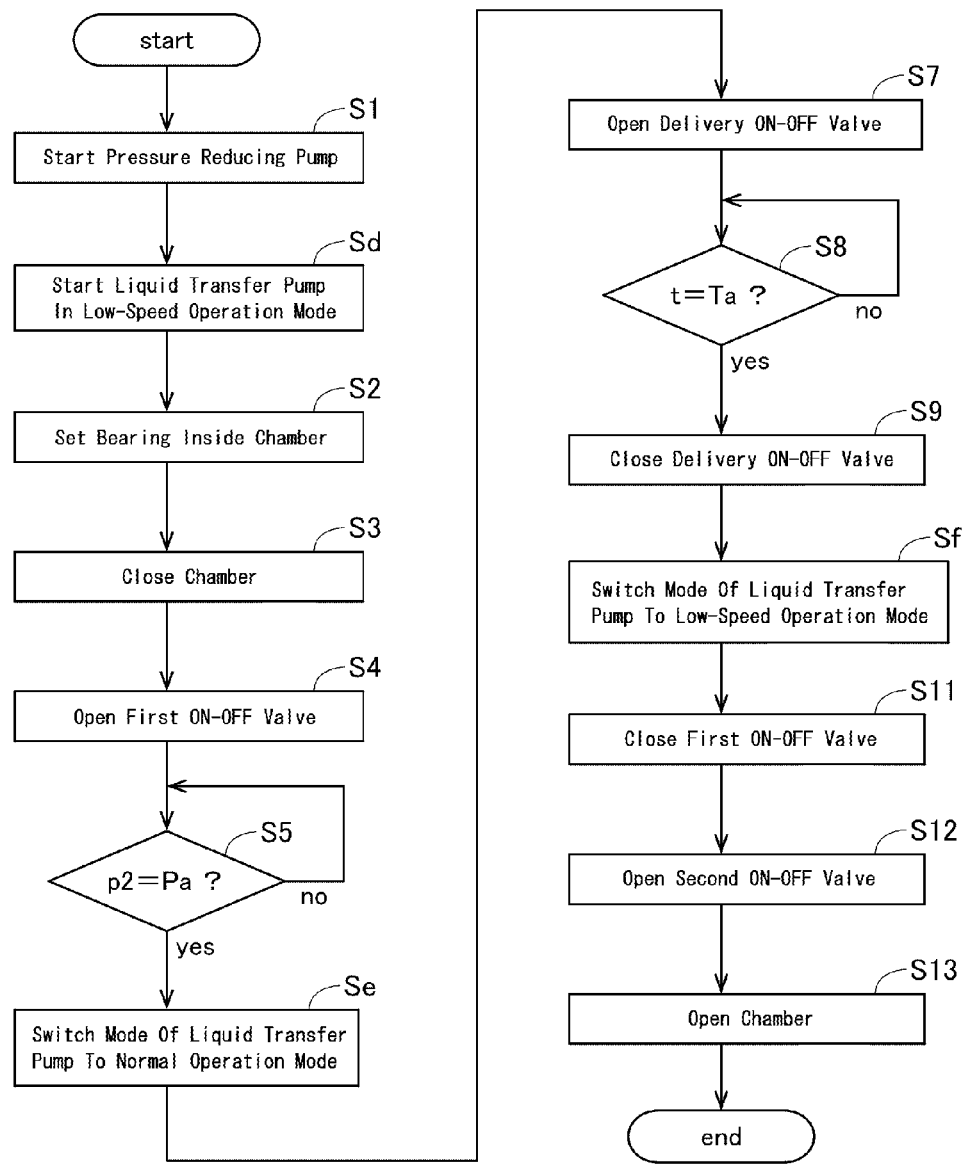
FIG. 9 is a flowchart illustrating an oil supply operation according to a modification of the above preferred embodiment of the present invention.

FIG. 9 is a flowchart illustrating an oil supply operation according to another modification of the above-described preferred embodiment. In the modification illustrated in FIG. 9, before the bearing 90 is set inside the chamber 20, the liquid transfer pump 30 is started to operate in a low-speed operation mode having a rotation rate lower than that of a normal operation mode (step Sd). Then, the liquid transfer pump 30 is caused to continue to operate in the low-speed operation mode during steps S2 to S5, that is, until the pressure reduction inside the chamber 20 is completed. Then, immediately before the delivery on-off valve 43 is opened, a mode of the liquid transfer pump 30 is switched from the low-speed operation mode to the normal operation mode (step Se). Then, the liquid transfer pump 30 is caused to continue to operate in the normal operation mode during steps S7 to S9, that is, until the discharge of the lubricating oil 9 is completed. Once the discharge of the lubricating oil 9 is completed, the mode of the liquid transfer pump 30 is switched from the normal operation mode back to the low-speed operation mode (step Sf).

As described above, in the modification illustrated in FIG. 9, the liquid transfer pump 30 continues to operate in the normal operation mode at all times while the delivery on-off valve 43 is open. Therefore, it is easy to control the amount of the lubricating oil 9 to be discharged, by opening and closing of the delivery on-off valve 43. In addition, a backflow of the lubricating oil 9 and introduction of air into the lubricating oil 9 through the outlet 421 while the delivery on-off valve 43 is open can be prevented. Moreover, in the modification illustrated in FIG. 9, the liquid transfer pump 30 is caused to operate in the low-speed operation mode while the delivery on-off valve 43 is closed. Thus, a pressure applied by the lubricating oil 9 on the delivery on-off valve 43 is reduced to reduce a damage to the delivery on-off valve 43. Moreover, a reduction in a power consumption of the oil supply apparatus 1 is achieved.

In the above-described preferred embodiment, the pressure inside the chamber 20 is recovered to the atmospheric pressure after the discharge of the lubricating oil 9 from the oil delivery mechanism 40 is completed. Note, however, that the pressure inside the chamber 20 may not necessarily be increased back to the atmospheric pressure. For example, the pressure inside the chamber 20 may be increased to a pressure higher than the atmospheric pressure after the discharge of the lubricating oil 9 from the oil delivery mechanism 40 is completed.

Also, in the above-described preferred embodiment, the pressure inside the oil tank 10 and the pressure inside the chamber 20 are actually measured by using the first and second pressure sensors 54 and 55, respectively, in order to place the pressure inside the oil tank 10 and the pressure inside the chamber 20 in the minimal or no pressure difference condition. However, if changes in the pressure inside the oil tank 10 and the pressure inside the chamber 20 caused by the pressure reducing pump 52 are reproducible, the pressure inside the oil tank 10 and the pressure inside the chamber 20 may be estimated based on an operating time of the pressure reducing pump 52 and a time during which the first on-off valve 53 is open, without being actually measured.

Also, in the above-described preferred embodiment, the common pressure reducing pump 52 is used to reduce the pressure inside the oil tank 10 and the pressure inside the chamber 20. Note, however, that separate pressure reducing pumps may be used to reduce the pressure inside the oil tank 10 and the pressure inside the chamber 20. In this case, suction of each of the two pressure reducing pumps may be controlled based on a detection value from a pressure sensor to place the pressure inside the oil tank 10 and the pressure inside the chamber 20 in the minimal or no pressure difference condition.

Also note that features of the above-described preferred embodiment and the modifications thereof may be combined appropriately as long as no conflict arises.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A bearing manufacturing method which supplies a lubricating oil stored in an oil tank under a reduced pressure environment to a bearing inside a chamber connected with the oil tank through piping and a liquid transfer pump, the liquid transfer pump including a housing defining a channel for the lubricating oil, and a rotor arranged to be magnetically levitated and rotate without making contact with the housing to generate a pressure which causes the lubricating oil to travel toward the chamber, the bearing manufacturing method comprising the steps of:

a) arranging the bearing inside the chamber;

b) reducing a pressure inside the chamber to make both a pressure inside the oil tank and the pressure inside the chamber lower than an atmospheric pressure, and to place the pressure inside the oil tank and the pressure inside the chamber in a minimal or no pressure difference condition which, if the liquid transfer pump were not provided, would not cause a flow of the lubricating oil in the piping;

c) after step b), flowing the lubricating oil from the oil tank into the chamber through power of the liquid transfer pump to inject the lubricating oil into the bearing; and d) after step c), increasing the pressure inside the chamber.

2. The bearing manufacturing method according to claim 1, wherein an oil delivery mechanism including an outlet arranged inside the chamber is further provided;

the oil delivery mechanism includes:
an injection tube portion including the outlet; and
an on-off valve arranged between the injection tube portion and the liquid transfer pump to open and close a channel for the lubricating oil; and step c) includes:
c1) starting the liquid transfer pump to generate a pressure which causes the lubricating oil to travel toward the oil delivery mechanism in the lubricating oil;
c2) after step c1), opening the on-off valve;
c3) after step c2), discharging a predetermined amount of the lubricating oil through the outlet;
c4) after step c3), closing the on-off valve; and
c5) after step c4), stopping the liquid transfer pump.

3. The bearing manufacturing method according to claim 2, wherein a position at which the channel is opened and closed by the on-off valve is inside the chamber.

4. The bearing manufacturing method according to claim 2, wherein the injection tube portion is made of stainless steel; and
a diameter of an inner circumferential surface of the injection tube portion is 0.4 mm or less.

5. The bearing manufacturing method according to claim 1, wherein an oil delivery mechanism including an outlet arranged inside the chamber is further provided;

the oil delivery mechanism includes:
an injection tube portion including the outlet; and
an on-off valve arranged between the injection tube portion and the liquid transfer pump to open and close a channel for the lubricating oil;

the liquid transfer pump is caused to operate at all times while steps a) to d) are performed; and step c) includes:
c1) opening the on-off valve;
c2) after step c1), discharging a predetermined amount of the lubricating oil through the outlet; and
c3) after step c2), closing the on-off valve.

6. The bearing manufacturing method according to claim 5, wherein a position at which the channel is opened and closed by the on-off valve is inside the chamber.

7. The bearing manufacturing method according to claim 5, wherein the injection tube portion is made of stainless steel; and
a diameter of an inner circumferential surface of the injection tube portion is 0.4 mm or less.

8. The bearing manufacturing method according to claim 1, wherein an oil delivery mechanism including an outlet arranged inside the chamber is further provided;

the oil delivery mechanism includes:
an injection tube portion including the outlet; and
an on-off valve arranged between the injection tube portion and the liquid transfer pump to open and close a channel for the lubricating oil;

the liquid transfer pump is caused to operate in a low-speed operation mode having a rotation rate lower than that of a normal operation mode in steps a) and b); and step c) includes:
c1) switching a mode of the liquid transfer pump from the low-speed operation mode to the normal operation mode;
c2) after step c1), opening the on-off valve;
c3) after step c2), discharging a predetermined amount of the lubricating oil through the outlet;
c4) after step c3), closing the on-off valve; and
c5) after step c4), switching the mode of the liquid transfer pump from the normal operation mode to the low-speed operation mode.

9. The bearing manufacturing method according to claim 8, wherein a position at which the channel is opened and closed by the on-off valve is inside the chamber.

10. The bearing manufacturing method according to claim 8, wherein the injection tube portion is made of stainless steel; and
a diameter of an inner circumferential surface of the injection tube portion is 0.4 mm or less.

11. The bearing manufacturing method according to claim 1, wherein the bearing includes a stationary bearing member, a rotatable bearing member, a bearing gap defined between the stationary bearing member and the rotatable bearing member, and a tapered opening portion joined to the bearing gap;

in step c), the lubricating oil is discharged into the opening portion; and in step d), the lubricating oil is caused to penetrate from the opening portion into the bearing gap by an increase in the pressure inside the chamber.

12. The bearing manufacturing method according to claim 11, wherein an oil delivery mechanism including an outlet arranged inside the chamber is further provided;

the oil delivery mechanism includes:
an injection tube portion including the outlet; and
an on-off valve arranged between the injection tube portion and the liquid transfer pump to open and close a channel for the lubricating oil; and step c) includes:
c1) starting the liquid transfer pump to generate a pressure which causes the lubricating oil to travel toward the oil delivery mechanism in the lubricating oil;
c2) after step c1), opening the on-off valve;
c3) after step c2), discharging a predetermined amount of the lubricating oil through the outlet;
c4) after step c3), closing the on-off valve; and
c5) after step c4), stopping the liquid transfer pump.

13. The bearing manufacturing method according to claim 12, wherein a position at which the channel is opened and closed by the on-off valve is inside the chamber.

14. The bearing manufacturing method according to claim 12, wherein
the injection tube portion is made of stainless steel; and
a diameter of an inner circumferential surface of the injection tube portion is 0.4 mm or less.

15. The bearing manufacturing method according to claim 11, wherein
an oil delivery mechanism including an outlet arranged inside the chamber is further provided;
the oil delivery mechanism includes:
an injection tube portion including the outlet; and
an on-off valve arranged between the injection tube portion and the liquid transfer pump to open and close a channel for the lubricating oil;
the liquid transfer pump is caused to operate at all times while steps a) to d) are performed; and
step c) includes:
c1) opening the on-off valve;
c2) after step c1), discharging a predetermined amount of the lubricating oil through the outlet; and
c3) after step c2), closing the on-off valve.

16. The bearing manufacturing method according to claim 15, wherein a position at which the channel is opened and closed by the on-off valve is inside the chamber.

17. The bearing manufacturing method according to claim 15, wherein
the injection tube portion is made of stainless steel; and
a diameter of an inner circumferential surface of the injection tube portion is 0.4 mm or less.

18. The bearing manufacturing method according to claim 11, wherein
an oil delivery mechanism including an outlet arranged inside the chamber is further provided;
the oil delivery mechanism includes:
an injection tube portion including the outlet; and
an on-off valve arranged between the injection tube portion and the liquid transfer pump to open and close a channel for the lubricating oil;
the liquid transfer pump is caused to operate in a low-speed operation mode having a rotation rate lower than that of a normal operation mode in steps a) and b); and
step c) includes:
c1) switching a mode of the liquid transfer pump from the low-speed operation mode to the normal operation mode;
c2) after step c1), opening the on-off valve;
c3) after step c2), discharging a predetermined amount of the lubricating oil through the outlet;
c4) after step c3), closing the on-off valve; and
c5) after step c4), switching the mode of the liquid transfer pump from the normal operation mode to the low-speed operation mode.

19. The bearing manufacturing method according to claim 18, wherein a position at which the channel is opened and closed by the on-off valve is inside the chamber.

20. The bearing manufacturing method according to claim 18, wherein
the injection tube portion is made of stainless steel; and
a diameter of an inner circumferential surface of the injection tube portion is 0.4 mm or less.

21. The bearing manufacturing method according to claim 1, wherein in step b), gas inside the oil tank and gas inside the chamber are sucked by using a common pressure reducing pump.

22. The bearing manufacturing method according to claim 1, wherein in step b), the pressure inside the chamber is reduced to 20 Pa or less.

* * * * *